United States Patent [19]

Kulka et al.

[11] Patent Number: 5,496,006
[45] Date of Patent: Mar. 5, 1996

[54] FASTENING DEVICE AND METHOD OF ATTACHMENT

[75] Inventors: Frederick C. Kulka, Troy; Michael G. Wunshcl, Romeo, both of Mich.

[73] Assignee: General Motors Corporation, Detroit, Mich.

[21] Appl. No.: 270,603

[22] Filed: Jul. 5, 1994

[51] Int. Cl.$^6$ ..................................................... A47F 5/08
[52] U.S. Cl. ........................... 248/231.9; 362/61; 411/55; 411/60
[58] Field of Search ........................... 248/231.9, 231.91, 248/231.2; 411/55, 60, 41; 403/297, 371, 289, 290; 362/61

[56] References Cited

U.S. PATENT DOCUMENTS

| | | | |
|---|---|---|---|
| 1,700,354 | 1/1929 | Foss | 411/55 X |
| 3,411,397 | 11/1968 | Birmingham | 411/41 |
| 3,596,948 | 8/1971 | Spoehr | 411/55 X |
| 3,832,931 | 9/1974 | Talan | 411/60 X |
| 4,270,328 | 6/1981 | Page et al. | 52/511 |
| 4,281,783 | 8/1981 | Ingram | 224/325 |
| 4,497,093 | 2/1985 | Haberkorn | 24/586 |
| 4,717,195 | 1/1988 | Okuyama et al. | 296/72 |
| 4,976,578 | 12/1990 | Mathes et al. | 411/512 |
| 5,193,643 | 3/1993 | McIntyre | 180/312 |

*Primary Examiner*—Ramon O. Ramirez
*Attorney, Agent, or Firm*—Jeffrey A. Sedlar

[57] ABSTRACT

Two components are attached together by a fastening device that permits three dimensional variation between the attachment points of the two component parts. The fastening device includes a bracket having a cylindrical body for insertion into the attachment opening of a first part and a leg for attachment to a second part. Rotation of the bracket about the cylindrical body provides two dimensions of adjustment. Sliding of the first part over the cylindrical body provides a third dimension of adjustment.

4 Claims, 2 Drawing Sheets

FASTENING DEVICE AND METHOD OF ATTACHMENT

BACKGROUND OF THE INVENTION

This invention relates to fastening devices and more particularly to fastening devices that compensate for three dimensional variation between the attachment points of the components that they fasten together.

When three dimensional variation between the attachment points of two components to be attached together can be expected, a fastening system that permits such variation must be used. FIG. 4 shows an illustration of a prior art fastening system 8 for attaching two components together that allows for three dimensional variation between the attachment points of the two components.

The usual procedure for the conventional attachment system 8 is to attach two angled brackets 1 and 2, to the attachment points of each of the individual components with threaded fasteners 3 and 4. The two brackets 1 and 2 are then aligned and attached to each other through the use of a third threaded fastener 5.

This type of attachment system becomes slow and cumbersome when the two components that are being attached together include several individual attachment points which require a corresponding number of mating bracket systems. Therefore, to effect a savings in the attachment of two components with fasteners that compensate for three dimensional variation between the attachment points of the two components a new simplified fastening system is needed.

SUMMARY OF THE INVENTION

The present invention relates to a fastening device and a method of attaching two parts together that may experience large build variations in any direction. The parts that are attached are located dimensionally correct independent of the variation in the attachment points of the two parts. The two parts are attached by means of a number of one-piece brackets corresponding to the number of attachment point pairs.

The one-piece bracket includes a cylindrical portion which snap fittingly attaches to an opening in a first part at an attachment point and a leg with an elongated opening which is attached to a second part at a corresponding attachment point. Two dimensions of adjustment are provided by rotating the bracket in the opening of the first part about the cylindrical portion, and aligning the elongated hole of the bracket's leg with the attachment point of the second part. Once aligned, a threaded fastener is driven through the elongated hole into the second part at the attachment point, fastening the leg portion of the bracket thereto. Optionally, an alternative means of attachment other than a threaded fastener is used.

A third dimension of adjustment is provided by allowing the opening of the first part to slide, within a range, over the cylindrical portion of the bracket. When the two parts are aligned in a dimensionally correct position, a second threaded fastener is driven into the end of the cylindrical portion of the bracket forcing its wall radially outward and locking the first part in position on the cylindrical portion. Optionally, the second threaded fastener is eliminated or an alternative expander means for forcing the wall of the cylindrical portion radially outward is used.

The advantages of this invention include the elimination of components, thereby reducing costs and simplifying assembly. The design also eliminates the need to align two individual brackets and provides a more robust means of attachment that results in higher quality and reliability of the assembly. This invention is particularly beneficial when a large component part having a plurality of attachment points is attached to an assembly.

DETAILED DESCRIPTION OF THE PRESENTLY PREFERRED EMBODIMENT

Figure 1:
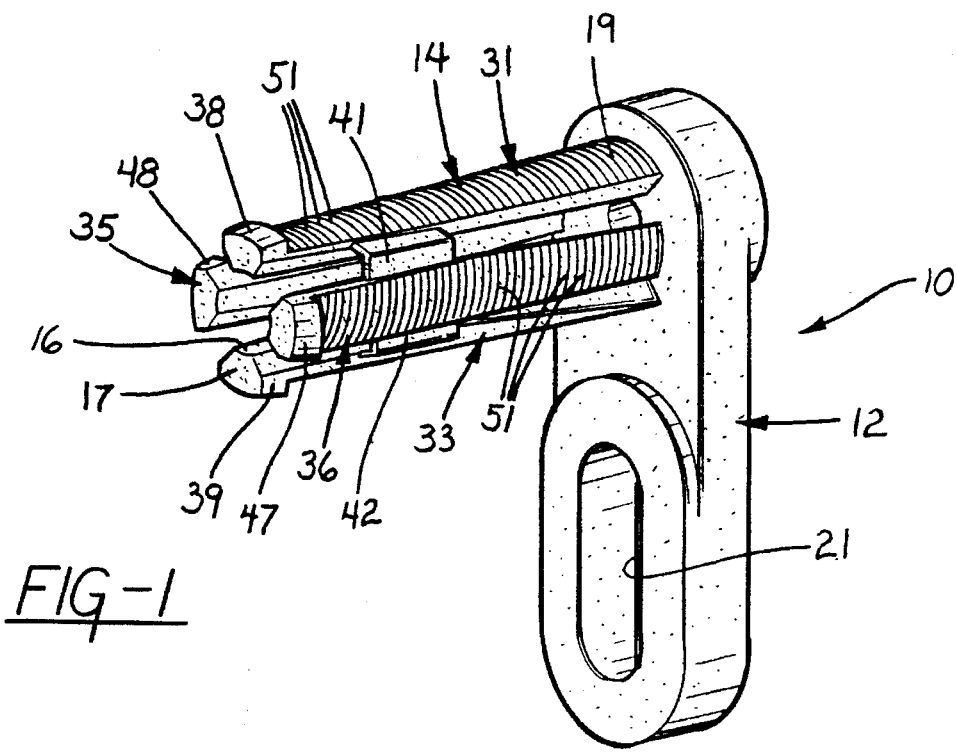
FIG. 1 is a perspective illustration of a bracket according to this invention.
Figure 2:
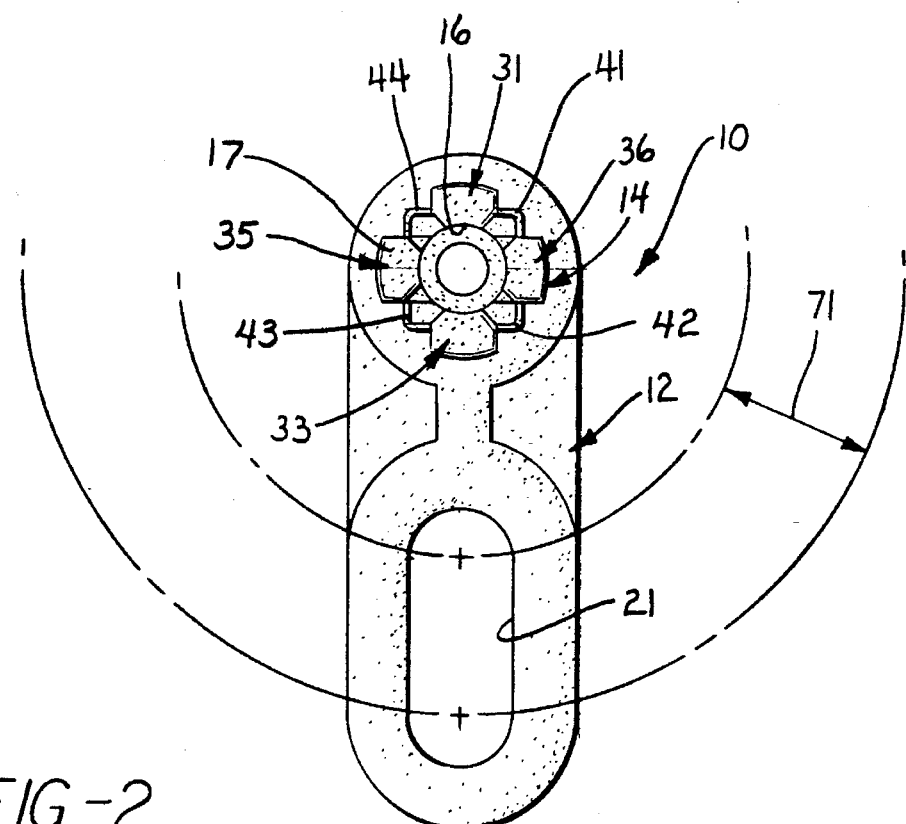
FIG. 2 is a plan view of a bracket according to this invention illustrating two dimensions of adjustment.

FIGS. 1 and 2 illustrate a molded one-piece bracket 10. Bracket 10 is substantially comprised of leg 12 and cylindrical body 14. Leg 12 comprises a flatten elongated shape for positioning on a relatively flat surface of an assembly about a point of attachment, in this embodiment, on a flat surface of vehicle body assembly 20 shown in FIG. 3. Leg 12 includes elongated hole 21 providing an opening through which a threaded fastener is driven to attach leg 12 to vehicle body assembly 20 at its point of attachment. Alternative means of attachment other than a threaded fastener may be used to attach leg 12 to the vehicle body assembly 20.

Cylindrical body 14 extends from leg 12 and is substantially perpendicular thereto. Cylindrical body 14 is comprised of opposed sector walls 31 and 33 which are integral with leg 12 at the end 19 of cylindrical body 14. Carried between opposed sector walls 31 and 33 are two locking elements, 35 and 36. Locking elements 35 and 36 are carried by opposed sector walls 31 and 33 by means of four interconnected webs 41–44.

Extending through the cylindrical body 14 from end 17 is expander opening 16. Webs 41–44 allow locking elements 35 and 36 to expand by moving radially outward when a threaded fastener or other expander means is positioned within expander opening 16 and driven into engagement with locking elements 35 and 36. The outer peripheral surface of locking elements 35 and 36 and opposed sector walls 31 and 33 include a number of grippers 51. Grippers 51 apply force radially outwardly to fix cylindrical body 14 in position when bracket 10 is installed.

The outer periphery of opposed sector walls 31 and 33 include hooks 38 and 39 at end 17 of cylindrical body 14. Similarly, the outer periphery of locking elements 35 and 36 include hooks 48 and 49. End 17 of cylindrical body 14 is collapsible to permit entry into an opening smaller in diameter than the normal at-rest outside diameter of hooks 38, 39, 48 and 49. End 17 is resilient whereby it reexpands to the normal at-rest outside diameter after passing through the opening.

FIG. 2 illustrates how bracket 10 of the present invention permits two dimensional variation in the lateral and vertical directions in attaching a component part in the form of headlamp carrier 92 to a vehicle body assembly 20. Cylindrical body 14 is snap fittingly attached into an opening 81 in headlamp carrier 92 in a manner permitting rotation of bracket 10 about the axis of cylindrical body 14. The rotation of bracket 10 positions elongated hole 21 across an arcing range of infinite positions wherein the attachment point on the vehicle body assembly 20 may fall. This range of positions is illustrated as tolerance range 71 in FIG. 2. Bracket 10 thereby allows two dimensional variation between the attachment points of headlamp carrier 92 and vehicle body assembly 20 by permitting the attachment point on vehicle body assembly 20 to be at any point within tolerance range 71.

Figure 3:
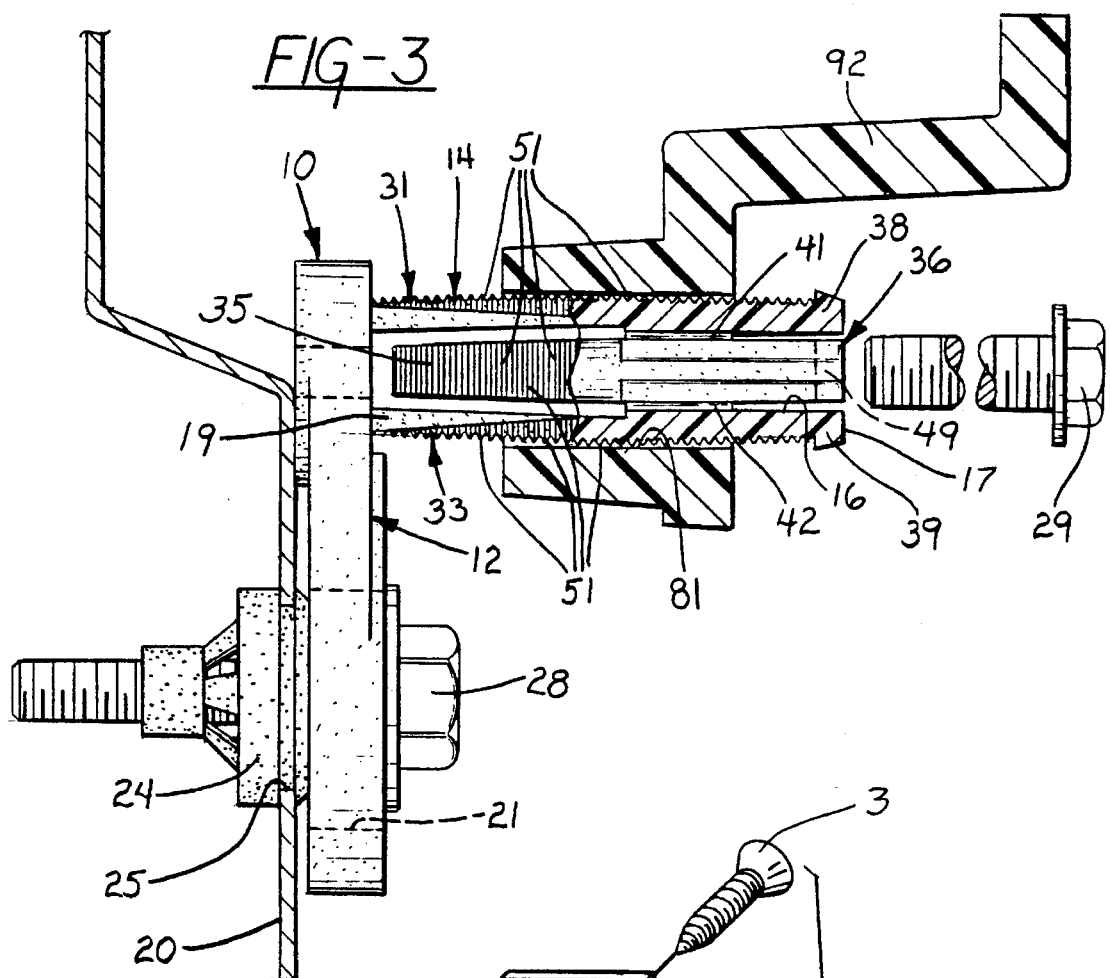
FIG. 3 is a partially exploded cross-sectional view of the attachment device according to the present invention.
Figure 4:
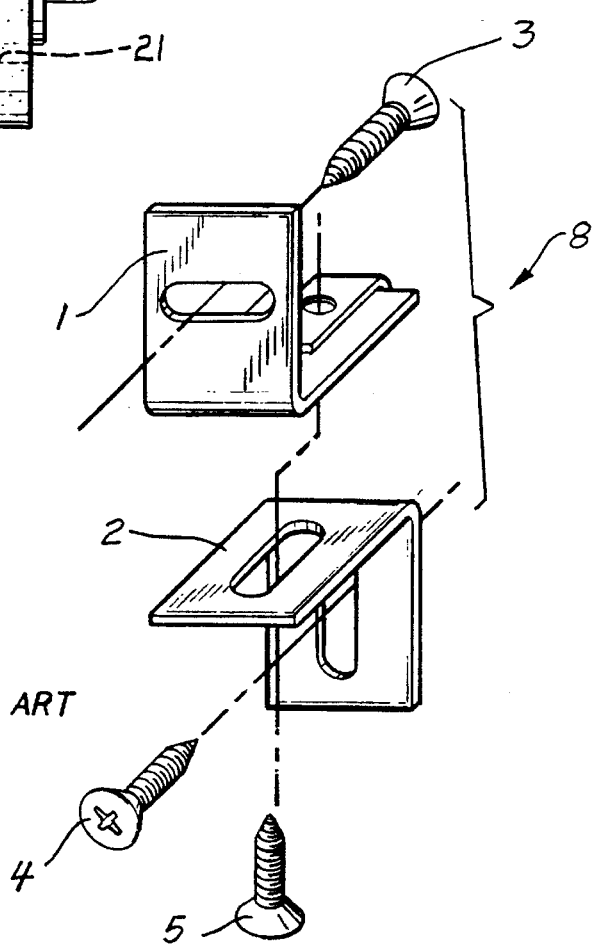
FIG. 4 illustrates a prior art attachment system.

FIG. 3 illustrates how bracket 10 of the present invention permits longitudinal variation between the headlamp carrier 92 and the attachment point on the vehicle body assembly 20. The cylindrical body 14 is snap fittingly attached into opening 81 of headlamp carrier 92. Headlamp carrier 92 is permitted to slide over the cylindrical body 14 through a range of infinite adjustment between leg 12 and hooks 38 and 39. This range of adjustment establishes a tolerance range between part 92 and vehicle body assembly 20 and therefore, a third dimension of variation between the attachment points of headlamp carrier 92 and vehicle body assembly 20 is permitted. As can readily be seen from a combination of FIGS. 2 and 3, one-piece bracket 10 allows three dimensional variation between the corresponding attachment points on the vehicle body assembly 20 and the headlamp carrier 92.

The invention operates in the following manner. Bracket 10 is attached to headlamp carrier 92 by snapping cylindrical body 14 into opening 81. The normal at-rest outside diameter of the end 17 of cylindrical body 14 about the hooks 38, 39, 48 and 49 is larger than the diameter of the opening 81 into which it is placed. End 17 is compressed to a reduced diameter when being inserted into opening 81. Spacing between sector walls 31 and 33 and locking elements 35 and 36 allows the diameter of the end 17 of cylindrical body 14 to be reduced when it is inserted into opening 81 of headlamp carrier 92.

After insertion, end 17 reexpands to the normal at-rest outside diameter, snapping bracket 10 into opening 81. When snapped into place, bracket 10 is retained on the part 92 since hooks 38, 39, 48 and 49 are larger than the diameter of opening 81. However, bracket 10 is free to slide axially, with the opening 81 of the part 92 positionable along cylindrical body 14 between the four hooks and leg 12. A range of infinite locations is thereby, provided for longitudinal adjustment of the headlamp carrier 92 in relation to leg 12 of bracket 10 and therefore, relative to vehicle body assembly 20. Additionally, lateral and vertical adjustments are accomplished by rotating bracket 10 about the cylindrical body 14 within the opening 81 moving elongated hole 21 through an arc.

The elongated hole 21 in leg 12 is aligned with the attachment point on the vehicle body assembly 20. The attachment point is comprised of plastic nut 24 which is carried by vehicle body assembly 20 in opening 25. When properly aligned, a threaded fastener 28 is driven through elongated hole 21 into nut 24 and the leg 12 is thereby attached in a fixed manner to the vehicle body assembly 20. Optionally, other attachment means are used for attaching leg 12 to vehicle body assembly 20.

After leg 12 is attached to vehicle body assembly 20 and headlamp carrier 92 is correctly positioned, a second threaded fastener 29 acting as expander means is driven into the expander opening 16 in the end 17 of cylindrical body 14. Fastener 29 expands locking elements 35 and 36 radially outward from the axis of the cylindrical body 14 forcing grippers 51 against headlamp carrier 92 about opening 81. Through the assistance of the grippers 51 on the exterior peripheral surface of cylindrical body 14 the headlamp carrier 92 is locked in a longitudinal position on cylindrical body 14.

The present invention is now described within the context of the method of attaching a headlamp carrier to the front of a vehicle body assembly. The structure that permits three dimensional variation between the two mating attachment points of the attached parts is applicable wherever it is preferred to attach two parts together in a dimensionally correct manner independent of three dimensional variation between the attachment points of the two parts.

Referring to FIG. 3 an application for which bracket 10 is applicable includes the attachment of a headlamp carrier 92 to the front of the vehicle body assembly 20. A plurality of attachment points exist between the headlamp carrier 92 and the vehicle body assembly 20 of a conventional automobile. Typically, three dimensional variations can exist between the attachment points of the molded headlamp carrier 92 and the vehicle body assembly 20. Several brackets 10 are used wherein each cylindrical body 14 is snapped into a corresponding attachment point represented by opening 81 in the headlamp carrier 92.

The elongated hole 21 of each bracket 10 is then aligned with the attachment point in the vehicle body assembly 20. The headlamp carrier 92 is then positionable in a dimensionally correct manner relative to the vehicle body assembly 20 independent of the three dimensional variation that may exist between the plurality of attachment points of the headlamp carrier and the corresponding plurality of attachment points on the vehicle body. When headlamp carrier 92 is correctly positioned, fasteners 28 are then driven through each elongated hole locking the headlamp carrier 92 in position vertically and laterally on the vehicle body assembly 20. Fasteners 29 are then driven into expander openings 16 locking the headlamp carrier 92 in position longitudinally on the vehicle body assembly 20.

What is claimed is:

1. A fastening device for attaching a part having a wall with an aperture therein to a surface and providing three-dimensional adjustment to compensate for surface and part dimensional variations comprising:

a leg having an elongated hole therethrough and a cylindrical body extending from the leg, the cylindrical body being elongated with grippers on the outer periphery thereof and terminating at an enlarged, hooked end;

wherein the cylindrical body is resilient and has an axial opening through the enlarged, hooked end with a plurality of radial openings extending radially through the cylindrical body connecting to the axial opening providing for contraction and expansion of the body and wherein the enlarged, hooked end is expandable and contractible; and an expander inserted into the axial opening forcing the grippers radially outward against the wall of the aperture, locking the part in location on the cylindrical body.

2. A fastening device according to claim 1 further comprising integrally molded webs extending across the radial openings limiting movement of the expandable and contractible end.

3. A fastening device according to claim 2 wherein the cylindrical body includes a locking element carried by the webs movable radially outward by the expander.

4. A fastening device for attaching a part having a wall with an aperture therein to a surface and providing three-dimensional adjustment to compensate for surface and part dimensional variations comprising:
- a leg having an elongated hole therethrough and a cylindrical body extending from the leg, the cylindrical body being elongated with grippers on the outer periphery thereof and terminating at an enlarged, hooked end;
- wherein the cylindrical body has an axial opening through the enlarged hooked end;
- wherein the aperture of the part is positioned along the cylindrical body within an infinitely variable range of positions between the enlarged, hooked end and the leg; and
- a screw inserted into the axial opening forcing the grippers against the wall in the aperture locking the part in position along the cylindrical body.

* * * * *

UNITED STATES PATENT AND TRADEMARK OFFICE
CERTIFICATE OF CORRECTION

PATENT NO. : 5,496,006

DATED : March 5, 1996

INVENTOR(S) : Frederick C. Kulka and Michael G. Wunschl

It is certified that error appears in the above-identified patent and that said Letters Patent is hereby corrected as shown below:

Title Page, at [75] "Wunshcl" should read -- Wunschl --.

Signed and Sealed this

Sixth Day of August, 1996

Attest:

BRUCE LEHMAN

*Attesting Officer*  *Commissioner of Patents and Trademarks*